(12) United States Patent
Heo et al.

(10) Patent No.: US 9,173,124 B2
(45) Date of Patent: Oct. 27, 2015

(54) SYSTEMS AND METHODS FOR WIRELESS SIGNAL MEASUREMENT AND REPORTING FOR DEVICE TO-DEVICE COMMUNICATION

(71) Applicant: Intel Corporation, Santa Clara, CA (US)

(72) Inventors: Youn Hyoung Heo, Seoul (KR); Hyung-Nam Choi, Hamburg (DE); Maik Bienas, Braunschweig (DE); Umesh Phuyal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 13/928,649

(22) Filed: Jun. 27, 2013

(65) Prior Publication Data

US 2014/0094162 A1   Apr. 3, 2014

Related U.S. Application Data

(60) Provisional application No. 61/707,784, filed on Sep. 28, 2012.

(51) Int. Cl.

| | |
|---|---|
| *H04W 4/00* | (2009.01) |
| *H04W 24/10* | (2009.01) |
| *H04W 48/14* | (2009.01) |
| *H04W 52/02* | (2009.01) |
| *H04W 36/08* | (2009.01) |
| *H04W 48/18* | (2009.01) |

(52) U.S. Cl.
CPC .............. *H04W 24/10* (2013.01); *H04W 48/14* (2013.01); *H04W 52/0209* (2013.01); *H04W 52/0212* (2013.01); *H04W 36/08* (2013.01); *H04W 48/18* (2013.01); *H04W 52/0261* (2013.01); *Y02B 60/50* (2013.01)

(58) Field of Classification Search
USPC ................... 455/422.1, 452.2, 522, 456, 67.1, 455/414.1; 370/332, 329, 341
See application file for complete search history.

(56) References Cited

U.S. PATENT DOCUMENTS

| | | |
|---|---|---|
| 2009/0238289 A1 | 9/2009 | Sampath et al. |
| 2011/0275382 A1 | 11/2011 | Hakola et al. |
| 2011/0294474 A1* | 12/2011 | Barany et al. .............. 455/414.1 |
| 2012/0021689 A1 | 1/2012 | Han |
| 2012/0033608 A1 | 2/2012 | Seo et al. |
| 2015/0110052 A1* | 4/2015 | Venkatachalam et al. .... 370/329 |

FOREIGN PATENT DOCUMENTS

WO    2012/091418 A2    7/2012

OTHER PUBLICATIONS

International Search Report and Written Opinion received for PCT Application No. PCT/US2013/061283, mailed on Jan. 13, 2014, 13 pages.

* cited by examiner

*Primary Examiner* — David Q Nguyen
(74) *Attorney, Agent, or Firm* — Stoel Rives LLP

(57) ABSTRACT

Methods, systems, and devices for configuration and reporting of proximity detection measurements are disclosed herein. User equipment (UE) is configured to receive and store a PD-RS list from an evolved universal terrestrial radio access network (E-UTRAN) node B (eNB). The PD-RS list includes a radio resource configuration for at least a first proximity discovery reference signal (PD-RS). The UE is configured to measure at least the first PD-RS to determine a signal parameter for the first PD-RS. The UE reports the signal parameter for the first PD-RS to the eNB.

22 Claims, 8 Drawing Sheets

Measurement Gap Pattern Configurations

| Gap pattern ID | Measurement gap length (MGL, ms) | Measurement gap repetition period (MGRP, ms) | Minimum available time for inter-frequency and inter-RAT measurements during 480 ms period (Tinter1, ms) | Measurement purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 6 | N_p (where N_p is the minimum periodicity of PD-RS to be measured) | TBD | Proximity discovery, D2D communication |

FIG. 4

SYSTEMS AND METHODS FOR WIRELESS SIGNAL MEASUREMENT AND REPORTING FOR DEVICE TO-DEVICE COMMUNICATION

RELATED APPLICATION

This application claims the benefit under 35 U.S.C. §119 (e) of U.S. Provisional Application No. 61/707,784, filed Sep. 28, 2012, which is incorporated by reference herein in its entirety.

TECHNICAL FIELD

The present disclosure relates to wireless signal measurement and reporting for device-to-device communication in a wireless communication network.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) standard; the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP LTE systems the radio access network (RAN) known as Evolved Universal Terrestrial Radio Access Network (E-UTRAN) includes the base station (also commonly denoted as E-UTRAN NodeB, eNodeB, or eNB), which communicate with a wireless communication device, known as user equipment (UE).

Proximity-based discovery and device-to-device (D2D) communication between devices (such as UEs) have gained strong interest because they provide the network operator the possibility to offer new types of applications and services for commercial, social, and public safety use. Furthermore, proximity-based discovery and D2D communication provide the network operator the possibility to temporarily offload user traffic exchanged between two UEs in proximity of each other from the network infrastructure to a D2D direct communication path.

BRIEF DESCRIPTION OF THE DRAWINGS

FIG. 4 is a table illustrating example measurement gap patterns consistent with embodiments disclosed herein.

DESCRIPTION OF EMBODIMENTS

Figure 1:
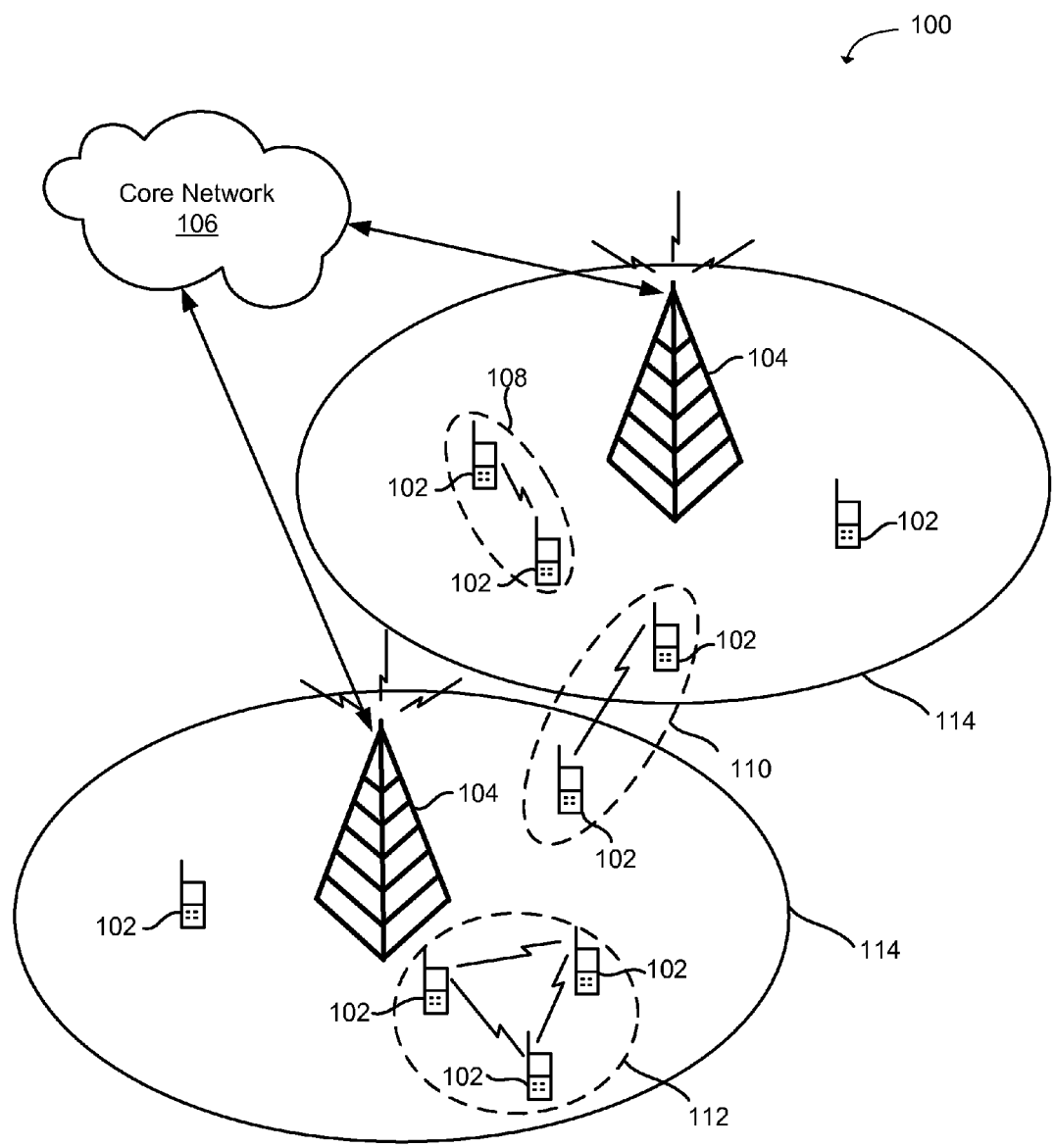
FIG. 1 is a schematic diagram illustrating a communication system for UE-assisted proximity discovery consistent with embodiments disclosed herein.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

There are two basic approaches for proximity discovery for UEs including UE-based discovery and UE-assisted discovery. In UE-based proximity discovery, the UE measures the proximity discovery signals transmitted from other UEs to be discovered, and determines on its own which of those UEs are within its proximity. In UE-assisted proximity discovery, the UE measures the proximity discovery signals transmitted from other UEs and sends the measured results to the network. UE-assisted proximity discovery allows the network to control device-to-device communication according to its own policies and can thus optimize the function and usage for the network and also maintain security for UEs. Network control is also useful when licensed bands are being used for D2D direct communication, such as in LTE direct. The present disclosure focuses on UE-assisted proximity discovery including, for example, configuration of UEs for signal measurement and reporting to the network.

An objective of 3GPP standard development organization (SDO) discussions is to study use cases and identify potential requirements for operator network controlled discovery and communications between devices that are in proximity, under continuous network control, and are under LTE network coverage. In this context a new type of UE and network is being considered that supports discovery and communications between devices that are in proximity. A UE and a network that implement these proximity services may be referred to as a D2D-enabled UE and a D2D-enabled network, respectively.

As used herein, the terms proximity discovery and proximity-based discovery are given to mean a process that identifies a device or UE that is in proximity to another UE. The term open proximity discovery is given to mean proximity discovery without explicit permission from the UE being discovered. The term restricted proximity discovery is given to mean a proximity discovery that takes place with permission from the UE being discovered. The term D2D communication is given to mean a communication between at least two or more UEs in proximity by means of a direct communication path established between the UEs. Examples of direct communication paths for D2D communication include LTE direct, WiFi direct, Bluetooth, or other direct communication path protocols or standards.

In a D2D-enabled network and/or with D2D-enabled UEs, proximity discovery may have different requirements based on whether or not a UE is currently engaged in D2D communication. For example, proximity detection while the UE is engaged in D2D communication may be used to determine whether another UE continues to remain in close enough proximity to continue the D2D communication. If the UE is not yet engaged in D2D communication, proximity detection may be used to determine whether another UE is close enough to the UE to establish a D2D session. In the live D2D communication situation, proximity may need to be detected on a frequent interval or even continuously to make sure that data can be communicated or so that a data flow may be switched to an infrastructure path before the UEs move too far apart. If the UE is not engaged in D2D communication, less frequent checks or even a single check for proximity may suffice.

According to one embodiment, proximity discovery is performed based on measurements of a reference signal made by a UE. For example, the UE may measure one or more reference signals from a UE or other device. In one embodiment, the results of these measurements are forwarded to the network (eNB and/or core network entity) to determine whether other UEs are in proximity of the reporting UE. According to one embodiment, the signals measured are UE-specific. For example, the UE measures the signals transmitted from other UEs instead of signals from a serving cell or a neighbor cell. The UE may measure any type of reference signal for proximity discovery. For example, an LTE uplink signal such as a sounding reference signal (SRS) can be used or another proximity detection or D2D-specific signal may be used. As used herein the term proximity discovery reference signal (PDRS) is given to generically mean any signal used as a reference signal for proximity discovery of a nearby device, such as a UE.

In one embodiment, different types of methods to trigger measurement or measurement reporting may be used depending on a current situation. For example, in case of proximity discovery when UE is not currently engaged in D2D communication, periodic or continuous proximity discovery may not be required. A single measurement or attempt at measurement for a certain measurement period may be sufficient to detecting whether another device is close enough to the UE. However, in the case of proximity discovery during D2D communication, periodic or continuous measurement may be required to manage D2D communication and ensure that the devices are close enough to carry on the D2D communication.

According to one embodiment, both open and restricted proximity discovery are possible with a D2D-enabled network and D2D-enabled UEs. In other words, proximity discovery may be possible with or without explicit permission from a UE being discovered. In case of open proximity discovery, the UE may be required to measure reference signals from a large number of UEs if there are many D2D UEs in proximity and may only detect a small number of UEs which actually allow themselves to be discovered. In case of restricted proximity discovery, an eNB may be configured to provide information regarding UEs that are available for discovery to a UE to reduce effort required by the UE for detection.

FIG. 1 is a schematic diagram illustrating a communication system 100 for UE-assisted proximity discovery. The communication system 100 includes a plurality of UEs 102, at least one evolved Node B (eNB) 104, and a core network 106.

According to one embodiment, the eNBs 104 and core network 106 provide communication services, data services, and/or other operator services to the UEs 102. For example, the core network 106 may provide access to voice services, media services, the Internet, and/or other communication, location, or data services.

In one embodiment, the UEs 102, eNBs 104, and core network 106 are D2D-enabled. For example, the UEs 102 may be capable of D2D communication with each other and the eNBs 104 and core network 106 may be configured to assist in proximity discovery and D2D communication establishment between the UEs 102. In one embodiment, one or more of the UEs 102 are configured to attempt to identify other UEs 102 that are within proximity. A UE 102 may measure signal quality or signal strength of a received discovery signal transmitted by another UE 102. The UE 102 may then send a measurement report to an eNB 104 which may determine whether the UEs 102 are in proximity and/or configure a D2D communication between UEs 102.

Some of the UEs 102 are involved in a first D2D communication session 108, a second D2D communication session 110, and a D2D group communication session 112. The first D2D communication session 108 involves two UEs 102 located within a coverage region 114 for the same eNB 104. According to one embodiment, because the UEs 102 can communicate with the same eNB 104, a single eNB 104 may be able to identify the proximity of the UEs 102 and/or configure the first D2D communication session 108. For example, the eNB 104 may not need to communicate with the core network 106 in order to establish the first D2D communication session 108. The second D2D communication session 110 involves two UEs 102 that are located within coverage regions 114 of different eNBs 104. According to one embodiment, because the UEs 102 cannot communicate with the same eNB 104, the eNBs 104 must communicate with each other and/or the core network 106 in order to identify the proximity of the UEs 102 and/or configure the second D2D communication session 110. In one embodiment, an eNB 104 may communicate with another eNB 104 to locate UEs 102 that may be connected to the other eNB 104 but nevertheless are in proximity for D2D communication. For example, each eNB 104 may need to communicate with neighboring eNBs 104 and a respective UE 102 in order to establish the second D2D communication session 110.

The D2D group communication session 112 involves more than two UEs 102 involved with each other in the D2D group communication session 112. For example, each UE 102 in the D2D group communication session 112 is involved in D2D communication with two other UEs 102. Three or more UEs 102 involved in a group communication session 112 may be referred to as a D2D group.

The plurality of UEs 102 may include any type of mobile communication device or computing device. For example, the UEs 102 may include mobile phones such as smart phones, tablet computers, personal digital assistants (PDAs), notebook computers, Ultrabook™ computers, or other communication or computing devices. The UEs 102 may also include low mobility or fixed location devices which nevertheless access communication or networking services via the eNBs 104 and/or core network 106. The eNBs 104 may include other types of radios depending on other embodiments and an implemented communication protocol.

Figure 2:
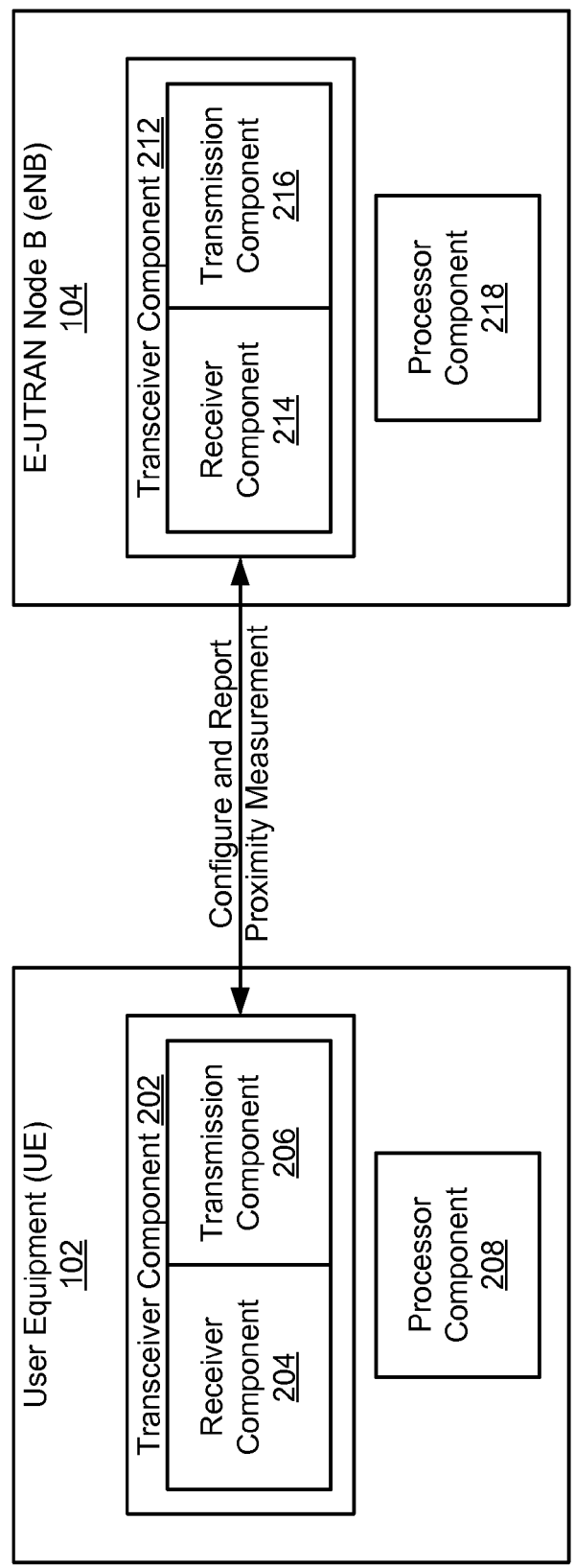
FIG. 2 is a schematic block diagram illustrating UE and eNB communicating to configure proximity measurement and reporting consistent with embodiments disclosed herein.

FIG. 2 illustrates an example of a UE 102 and an eNB 104 communicating to configure and report proximity measurements, according to one embodiment. The UE 102 includes a transceiver component 202 and a processing component 208. The processing component 208 is configured to generate capability information, measure reference signals, and generate measurement reports as well as perform other functions of the UE 102 as described herein. The transceiver component 202 includes a receiver component 204 configured to receive reference signals, configuration information, and other signals and messages as described herein. The transceiver component 202 also includes a transmission component 206 configured to transmit capability information, measurement reports, and other signals and messages as described herein.

The eNB 104 includes a transceiver component 212 and a processing component 218. The processing component 218 is configured to generate configuration information for the UE 102, determine a capability of the UE 102, determine a proximity of a device to the UE 102 based on measurement reports, and perform other functions of the eNB 104 as described herein. The transceiver component 212 includes a receiver component 214 configured to receive measurement reports, capability information, and other signals and messages as described herein. The transceiver component 212 also includes a transmission component 216 configured to transmit configuration information, transmit messages to configure a D2D session, and to transmit other signals and messages as described herein.

Figure 3:
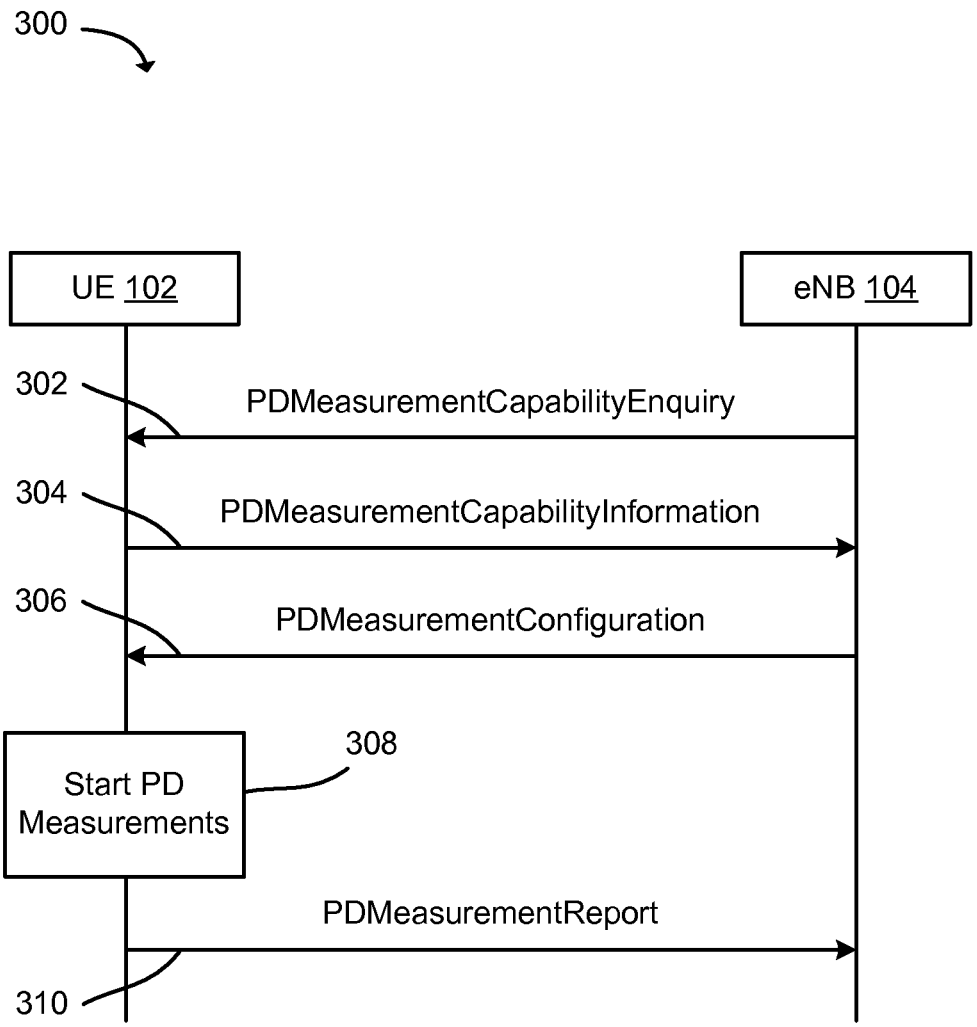
FIG. 3 is a diagram of a communication message flow illustrating communication between a UE and an eNB to configure, measure, and report proximity detection measurements consistent with embodiments disclosed herein.

FIG. 3 is a diagram of a communication message flow illustrating a communication procedure 300 between a UE 102 and an eNB 104 to configure, measure, and report proximity detection measurements, according to one embodiment. The communication procedure 300 may be performed to determine a proximity of another UE 102 or device. The communication procedure 300 may be performed, for example, in response to the UE 102 executing an application that can utilize proximity-based services. The application and/or the UE 102 may determine that proximity-based services may be required or be helpful to the operation of the UE 102. Similarly, the communication procedure 300 may be performed in response to the eNB 104 detecting traffic that may be routed over a D2D path to reduce a load on network infrastructure and/or to provide proximity-based services to one or more UEs 102.

The eNB 104 enquires 302 as to the capabilities of the UE 102. The eNB 104 may enquire 302 as to the capabilities of the UE 102 by sending a proximity detection (PD) measurement capability enquiry message. The enquiry 302 may request specific information regarding the UE's capabilities including whether the UE 102 is capable of D2D communication, the types of D2D communication for which the UE 102 is configured, and/or whether the UE 102 is capable of simultaneous transmission or reception of additional signals while receiving PD-RS. The latter capability may be used by the UE 102 to indicate whether it supports the following cases to the eNB 104. In the first case the UE 102 can measure incoming PD-RS while it simultaneously transmits PD-RS for another UEs' proximity discovery. In the second case the UE 102 can measure incoming PD-RS while it simultaneously transmits LTE uplink signal to the eNB 104 or transmits signals to other D2D-enabled UEs 102. In the third case the UE 102 can measure incoming PD-RS while it simultaneously receives LTE downlink signal from the eNB 104 or receives signals from other D2D-enabled UEs 102.

The UE 102 provides 304 capability information to the eNB 104 indicating capabilities of the UE 102. For example, the UE 102 may provide 304 a PD measurement capability information message that indicates the capabilities of the UE 102. The capability information may indicate whether the UE 102 is capable of simultaneous transmission or reception of additional signals while receiving PD-RS. For example, if the UE 102 includes only a single radio frequency (RF) chain, the UE 102 may not be capable of measuring an incoming signal while simultaneously transmitting a signal. Additionally, the capability information provided 304 by the UE 102 may indicate D2D protocols and interfaces through which the UE 102 is capable of direct communication. For example, the capability information may indicate that the UE 102 is capable of direct communication using LTE direct, WiFi direct, Bluetooth, and/or other protocols or standards.

The eNB 104 provides 306 measurement configuration information to the UE 102. The eNB 104 may provide 306 a PD measurement configuration message that includes a variety of settings and values to configure the UE 102 for PD-RS measurement. In one embodiment, the eNB 104 may provide a message indicating one or more of a measurement gap pattern, radio resource configuration information for a proximity discovery reference signal (PD-RS), an event definition, a reporting interval, a discovery type (e.g., open or restricted), and/or a plurality of other types of settings.

In one embodiment, the eNB 104 provides 306 measurement configuration information that includes a measurement gap pattern. For example, if the capability information provided 304 by the UE 102 indicates that the UE is not capable of simultaneous transmission or reception of additional signals while receiving PD-RS, the eNB 104 may provide 306 a measurement gap pattern that configures the UE 102 to measure incoming PD-RS signals during a measurement gap and prohibits the UE 102 from transmitting or receiving signals during the measurement gap.

Measurement gaps may be needed because, at least in some embodiments, proximity discovery and D2D communication are supported using a UL resource. For example, PD-RS may be transmitted on uplink resource such as in LTE frequency division duplex (FDD) mode or LTE time division duplex (TDD) mode. In LTE FDD mode, PD-RS may be transmitted in the uplink subframes of the uplink frequency band while in LTE TDD mode the PD-RS may be transmitted in the subframes reserved for uplink transmission of the TDD frequency band. Therefore, if a UE 102 has only one RF chain, the UE 102 may be required to transmit and receive signals simultaneously, unless measurement gaps are configured. In the case where a UE 102 is able to transmit and receive signals simultaneously, a measurement gap pattern and/or measurement gap may not need to be configured.

FIG. 4 illustrates a measurement gap table 400 illustrating example measurement gap patterns which may be configured in the UE 102 by the eNB 104. The gap patterns identified as in the "Gap Pattern ID" column represent LTE gap pattern configurations defined in LTE that may be reused for measurement gap patterns for proximity detection. For example, the "Measurement Purpose" column indicates the purposes for which the gap patterns "0" and "1" were implemented, and the LTE standard may be modified to include a further purpose for proximity detection and/or D2D communication. In one embodiment, a single measurement gap pattern may be shared for both proximity detection measurements as well as for other measurement purposes. For example, if the UE 102 needs to perform both PD-RS measurement and other measurements requiring a measurement gap, e.g., inter-frequency or inter-radio access technology (RAT) measurements, the measurement gap can be shared for both PD-RS measurement and other measurements. In case the length of the measurement gap is not sufficient to perform both PD-RS measurement and inter-frequency or inter-RAT measurement, then PD-RS measurement may be prioritized such that inter-frequency and/or inter-RAT measurement is performed after PD-RS measurement is completed. Alternatively, inter-frequency and/or inter-RAT measurements may be prioritized and thus, PD-RS measurement may be performed after the inter-frequency and/or inter-RAT measurement is completed. The prioritization of the measurements may be included within the measurement gap pattern configuration or may be left for implementation in the UE 102.

In one embodiment, a measurement gap pattern configuration optimized for PD-RS measurement may also be configurable. For example, in order to save the UE 102 power consumption as much as possible, a different periodicity for a proximity detection measurement gap may be desirable. In one embodiment, the periodicity of a measurement gap to measure PD-RSs is longer than that of a cell reference signal (CRS). The gap pattern "2" in FIG. 4 illustrates one embodiment of a proximity detection-specific measurement gap pattern. The measurement gap repetition period (MGRP) is listed as N_p which is the minimum periodicity for any PD-RS to be measured. By matching the period for a measurement gap pattern to the PD-RS, reduced energy usage may be accomplished for the UE 102. Similar to gap patterns "0" and "1," the measurement gap of gap pattern "2" may be shared for other measurement purposes.

Returning to FIG. 3, the eNB 104 may provide 306 measurement configuration information that includes radio resource configuration information for a proximity discovery reference signal. For example, the eNB 104 may provide 306 radio resource configuration information for a device that is discoverable by the UE 102. The radio resource configuration information may include information to allow the UE 102 to more easily locate a signal that is discoverable and also allow the UE 102 to more quickly and/or accurately determine a signal parameter of a PD-RS that corresponds to the other device. The radio resource configuration information may include a transmission offset that indicates a transmission power for a corresponding PD-RS. This PD-RS-specific transmission offset may only be required when the proximity discovery signal is transmitted with a different transmit power. For example, if all UEs 102 transmit proximity discovery signals with a same power (e.g., a maximum transmit power), PD-RS-specific transmission offsets may not be required. Thus, the measurement of the PD-RS may be used to more accurately and quickly determine a signal parameter of the other device and/or a proximity of the other device. In one embodiment, the radio resource configuration information includes an identifier for the PD-RS and/or a device that is transmitting the PD-RS.

In one embodiment, the UE 102 may store a PD-RS list of signals which are to be measured by the UE 102. The PD-RS list may store an identifier, transmission offset, or other information specific to a PD-RS to be measured by the UE. The PD-RS list may include radio resource configuration information or other information received from the eNB 104. For example, each time the UE 102 receives radio resource configuration information from the eNB 104, the UE 102 may update the PD-RS list to reflect the new radio resource configuration information. According to one embodiment, the eNB 104 maintains the PD-RS list by controlling what is included in the PD-RS list. In one embodiment, the eNB 104 may transmit a message to add, modify, or remove a PD-RS of the PD-RS list. For example, a PD-RS addition or replacement message to add or modify a PD-RS may include an identifier and radio resource configuration information for the PD-RS. In one embodiment, the eNB can add a new PD-RS to the PD-RS list or modify an existing PD-RS by signaling a PD measurement configuration message with a PD-RSToAddModList information. A PD-RS removal message to remove a PD-RS from the PD-RS list may include an index corresponding to the PD-RS to be removed. In one embodiment, only an index is needed because each PD-RS in the PD-RS list includes its own unique index in the list. An existing PD-RS entry can be removed from the PD-RS list by signaling a PD measurement configuration message with a PD-RSToRemoveList information.

According to one embodiment, the eNB 104 may provide 306 measurement configuration information that includes an event definition and/or a reporting interval defining when to report measurement data to the eNB 104. An event definition may define an occurrence that triggers reporting of a measurement for a PD-RS or for multiple PD-RSs. A reporting interval may define a time interval on which measurement reports for any measured PD-RSs or a subset of measured PD-RSs should be reported. In one embodiment, a reporting interval may configure the UE 102 to provide a measurement report periodically on the reporting interval regardless of whether the event is detected. In another embodiment, a reporting interval may configure the UE 102 to provide a measurement report periodically on the reporting interval in response to detecting the event. Further discussion of measurement reporting and triggering of measurement reporting will be discussed below in relation to providing 310 a PD measurement report of FIG. 3 and FIGS. 5, 6, 7, and 8.

According to one embodiment, the eNB 104 provides 306 measurement configuration information that indicates a discovery type to be performed by the UE 102. In one embodiment, the eNB 104 selectively configures the UE 102 to perform an open proximity discovery wherein the UE 102 is free to perform proximity discovery measurements on any PD-RS it detects. For example, even if the UE 102 stores a PD-RS list and/or if the eNB 104 provides radio resource configuration information for one or more PD-RSs, the UE 102 may be configured to perform proximity discovery on a PD-RS that does not correspond to an entry in the PD-RS list or radio resource configuration information provided by the eNB 104. Alternatively, the eNB 104 may selectively configure the UE 102 to perform restricted proximity discovery. In restricted proximity discovery, the UE 102 may only perform measurements on PD-RSs for which the UE 102 has received radio resource configuration information or other information from the eNB 104. For example, the UE 102 may only perform measurements on PD-RSs in a PD-RS list stored on the UE 102 when the UE 102 is configured for restricted proximity discovery.

The following shows an example of ASN.1 coding for MeasObjectEUTRA to configure a measurement object, such as a PD-RS, with the UE 102:

```
MeasObjectEUTRA ::=         SEQUENCE {
    carrierFreq                 ARFCN-ValueEUTRA,
    allowedMeasBandwidth        AllowedMeasBandwidth,
    presenceAntennaPort1        PresenceAntennaPort1,
    neighCellConfig             NeighCellConfig,
    offsetFreq                  Q-OffsetRange           DEFAULT dB0,
    -- Cell list
    cellsToRemoveList           CellIndexList           OPTIONAL, -- Need ON
    cellsToAddModList           CellsToAddModList       OPTIONAL, -- Need ON
    -- Black list
```

```
    blackCellsToRemoveList         CellIndexList                      OPTIONAL, -- Need ON
    blackCellsToAddModList         BlackCellsToAddModList             OPTIONAL, -- Need ON
    cellForWhichToReportCGI        PhysCellId                         OPTIONAL, -- Need ON
    ...,
    [[measCycleSCell-r10           MeasCycleSCell-r10                 OPTIONAL, -- Need ON
    measSubframePatternConfigNeigh-r10    MeasSubframePatternConfigNeigh-r10
    OPTIONAL -- Need ON
    ]],
    typePD-RSMeas                  ENUMERATED{open, restricted}       OPTIONAL, -- Need ON
    pD-RSToRemoveList              PD-RSIndexList                     OPTIONAL, -- Condi restricted
    pD-RSToAddModList              PD-RSToAddModList                  OPTIONAL -- Condi restricted
}
PD-RSToAddModList ::=     SEQUENCE (SIZE (1..maxPD-RSMeas)) OF PD-RSToAddMod
PD-RSToAddMod ::= SEQUENCE {
    pD-RSIndex                INTEGER (1.. maxPD-RSMeas),
    pD-RSresourceConf         PD-RSresourceConf,
    pD-RSIndividualOffset     OffsetRange
}
PD-RSIndexList :: =       SEQUENCE (SIZE(1...maxPD-RSMeas)) OF PD-RSIndex
PD-RSIndex ::=            INTEGER(1..maxPD-RSMeas)
PD-RSresourceConf ::=     SEQUENCE {
    pD-RSresourceConfig       INTEGER (0..99),
    pD-RSsubframeConfig       INTEGER (0..9)
}
maxPD-RSMeas              INTEGER ::= 64 -- Maximum number of PD-RS to measure
maxPD-RS                  INTEGER ::= 128 -- Maximum number of PD-RS
OffsetRange ::=    ENUMERATED {
    dB-24, dB-22, dB-20, dB-18, dB-16, dB-14,
    dB-12, dB-10, dB-8, dB-6, dB-5, dB-4, dB-3,
    dB-2, dB-1, dB0, dB1, dB2, dB3, dB4, dB5,
    dB6, dB8, dB10, dB12, dB14, dB16, dB18,
    dB20, dB22, dB24}
```

The field typePD-RSMeas indicates whether PD-RS measurement is in an open discovery mode or restricted discovery mode. If it is in an open discovery mode, the UE 102 can measure a PD-RS which is not in the PD-RS list. Otherwise, the UE 102 measures PD-RS configured in the PD-RS list only (restricted mode). The field pD-RSToRemoveList may be used to indicate a list of PD-RSs to remove from the PD-RS list. The field pD-RSToAddModList may be used to indicate a list of PD-RSs to add or modify in the PD-RS list. The field pD-RSIndex indicates an index of a PD-RS in the PD-RS list. The field pD-RSresourceConf indicates the radio resource configuration for a PD-RS. The field pD-RSIndividualOffset indicates a PD-RS specific transmission offset for a specific PD-RS. The values dB-24, dB-22, etc in the OffsetRange correspond to −24 dB, −22 dB, and so on. In one embodiment, the fields pD-RSToRemoveList and pD-RSToAddModList are mandatory in the case where typePD-RSMeas is set to restricted and are not needed when typePD-RSMeas is set to open.

In one embodiment, a new measurement object MeasObjectD2D can be introduced instead of modifying the MeasObjectEUTRA object as illustrated above:

```
MeasObjectD2D ::= SEQUENCE {
    carrierFreq             ARFCN-ValueEUTRA,
    typePD-RSMeas           ENUMERATED{open, restricted}   OPTIONAL, -- Need ON
        pD-RSToRemoveList   PD-RSIndexList         OPTIONAL, -- Condi restricted
        pD-RSToAddModList   PD-RSToAddModList      OPTIONAL -- Condi restricted
}
PD-RSToAddModList ::=     SEQUENCE (SIZE (1..maxPD-RSMeas)) OF PD-RSToAddMod
PD-RSToAddMod ::= SEQUENCE {
    pD-RSIndex                INTEGER (1.. maxPD-RSMeas),
    pD-RSresourceConf         PD-RSresourceConf,
    pD-RSIndividualOffset     OffsetRange
}
PD-RSIndexList :: =       SEQUENCE (SIZE(1...maxPD-RSMeas)) OF PD-RSIndex
PD-RSIndex ::=            INTEGER(1..maxPD-RSMeas)
PD-RSresourceConf ::=     SEQUENCE {
    pD-RSresourceConfig       INTEGER (0..99),
    pD-RSsubframeConfig       INTEGER (0..9)
}
maxPD-RSMeas              INTEGER ::= 64 -- Maximum number of PD-RS to measure
maxPD-RS                  INTEGER ::= 128 -- Maximum number of PD-RS
OffsetRange ::=    ENUMERATED {
    dB-24, dB-22, dB-20, dB-18, dB-16, dB-14,
    dB-12, dB-10, dB-8, dB-6, dB-5, dB-4, dB-3,
    dB-2, dB-1, dB0, dB1, dB2, dB3, dB4, dB5,
    dB6, dB8, dB10, dB12, dB14, dB16, dB18,
    dB20, dB22, dB24}
```

Returning to FIG. 3, the UE 102 measures 308 PD-RS signals based on the received configuration information. For example, the UE 102 may measure one or more PD-RS signals located in a PD-RS list to determine a signal parameter for each PD-RS. The signal parameter may include a signal strength, signal to noise ratio, signal to interference ratio (SIR), or other signal parameter of the PD-RS that may be helpful for proximity detection. In one embodiment, the UE 102 measures 308 the PD-RS signals during a measurement gap and prohibits UL transmission during the measurement gap, as configured by the eNB 104. The UE 102 may also be configured to determine whether a specific PD-RS corresponds to a device that is engaged in D2D communication with the UE 102. In one embodiment, a PD-RS that corresponds to a device engaged in D2D communication with the UE 102 may be measured 308 more frequently than another PD-RS.

The UE 102 reports 310 PD-RS measurements to the eNB 104. The reported 310 measurements may include one or more signal parameters determined by the UE 102. In one embodiment, the eNB 104 wants to receive the information regarding whether there are other devices in proximity of a UE 102. The UE 102 measures each PD-RS that is detected during a measurement period, such as a measurement gap. A single attempt at signal detection and measurement may be sufficient as long as the measurement is reliable and as long as the UE measures sufficient percentage of detected PD-RSs. The UE 102 may or may not need to perform periodic PD-RS measurements for proximity discovery to see if there are any nearby devices. Although there may be minimal requirements for frequency of PD-RS measurement prior to establishing a D2D session, this can change significantly following establishing of a D2D communication session. For example, after the D2D session is established, it is also generally necessary to determine whether the devices continue to remain in proximity and/or whether any additional devices come into proximity of the UE 102. Therefore, more frequent measurement reporting to manage a D2D session may be required.

Three types of measurement reporting methods may need to be considered for supporting different implementations of proximity discovery and D2D communication including event-triggered reporting, periodic reporting, and periodic reporting after event triggering.

In event-triggered reporting a UE 102 can send a measurement report when a measurement meets one or more reporting criteria as defined in an event definition. In one embodiment, the UE 102 sends a PD measurement report to the eNB 104 in response to a triggering event. For example, an event definition received from the eNB 104 may define an occurrence of a triggering event. The UE 102 may detect occurrence of the event and report 310 a measurement to the eNB 104. The occurrence of the event and/or the measurement report may be used by the eNB 104 to determine whether a UE 102 is close enough to another UE 102 in order to be involved in a D2D communication session. In one embodiment, the event includes a change of a signal parameter of a PD-RS that indicates another device has moved within or out of range of the UE 102. Event-triggered reporting may be beneficial to save the amount of reporting signaling because the UE 102 can send the measurement reports only when the signal quality of a PD-RS has changed (e.g., has become strong enough to connect or weak enough to drop D2D communication).

In one embodiment, an event definition defines an occurrence of a signal parameter for a PD-RS exceeding an absolute threshold. Detection of a PD-RS exceeding an absolute threshold may be useful to determine whether a corresponding device can participate in a D2D session with the UE 102, regardless of whether or not the UE 102 is already involved in a D2D session. A UE 102 may compare measurements for a PD-RS to one or more conditions defining the occurrence of the PD-RS exceeding an absolute threshold. In one embodiment, an entering condition for exceeding an absolute threshold is determined based on equation (1) below and a leaving condition for falling below an absolute threshold is determined based on equation (2) below.

$$Ms - Hys > Thresh \qquad (1)$$

$$Ms + Hys < Thresh \qquad (2)$$

Ms corresponds to measured value for the PD-RS, Hys corresponds to a hysteresis value defined by the eNB 104 or in the UE 102, and Thresh corresponds to the absolute threshold value. Ms may be a measurement of received signal strength in dBm, a measurement of a signal to interference ratio (SIR) in dB, or any other signal parameter. The parameters Hys and Thresh may be configured through RRC (Radio Resource Control protocol sublayer) signaling between the UE 102 and eNB 104. According to one embodiment, a measurement report is triggered in response to the occurrence of the entering condition.

Figure 5:
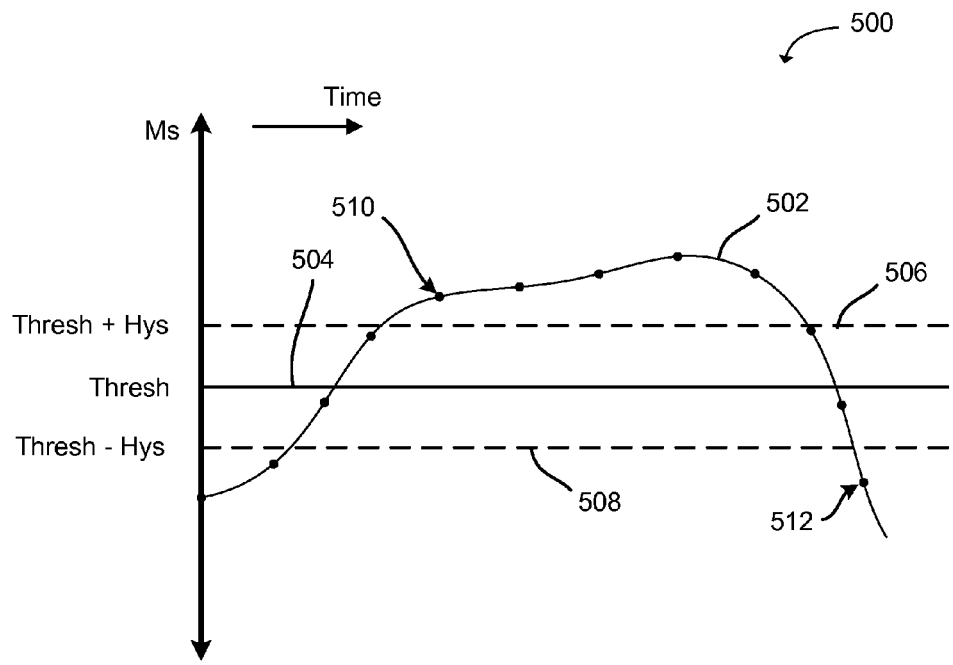
FIG. 5 is a graph illustrating a signal parameter exceeding an absolute threshold consistent with embodiments disclosed herein.

FIG. 5 is a signal parameter graph 500 illustrating a signal parameter value Ms of a PD-RS over time as measured by the UE 102. The graph 500 includes a line 502 that illustrates a measured value for a signal parameter over time. The dots on line 502 indicate points at which the UE 102 measures the PD-RS to obtain the value Ms. The graph 500 also shows an absolute threshold value 504 as well as hysteresis values 506 and 508 above and below the absolute threshold value 504. Point 510 indicates when the UE 102 detects the occurrence of the entering condition and point 512 indicates where the UE 102 detects the occurrence of the leaving condition. In one embodiment, in response to detecting the entering condition the UE 102 may trigger a measurement report of a current value of the signal parameter to the eNB 104.

In one embodiment, an event definition defines an occurrence of a signal parameter for a PD-RS falling below an absolute threshold. Detection of a PD-RS falling below an absolute threshold may be useful for determining whether a D2D session should be terminated and/or if communication flows should be switched to an infrastructure communication path. In one embodiment, an entering condition for falling below the absolute threshold is determined based on equation (3) below and a leaving condition for exceeding the absolute threshold is determined based on equation (4) below.

$$Ms + Hys < Thresh \qquad (3)$$

$$Ms - Hys > Thresh \qquad (4)$$

According to one embodiment, a measurement report is triggered in response to the occurrence of the entering condition. In one embodiment, the UE 102 may also determine whether the PD-RS corresponds to a device with which the UE 102 is in D2D communication before sending the measurement report.

Figure 6:
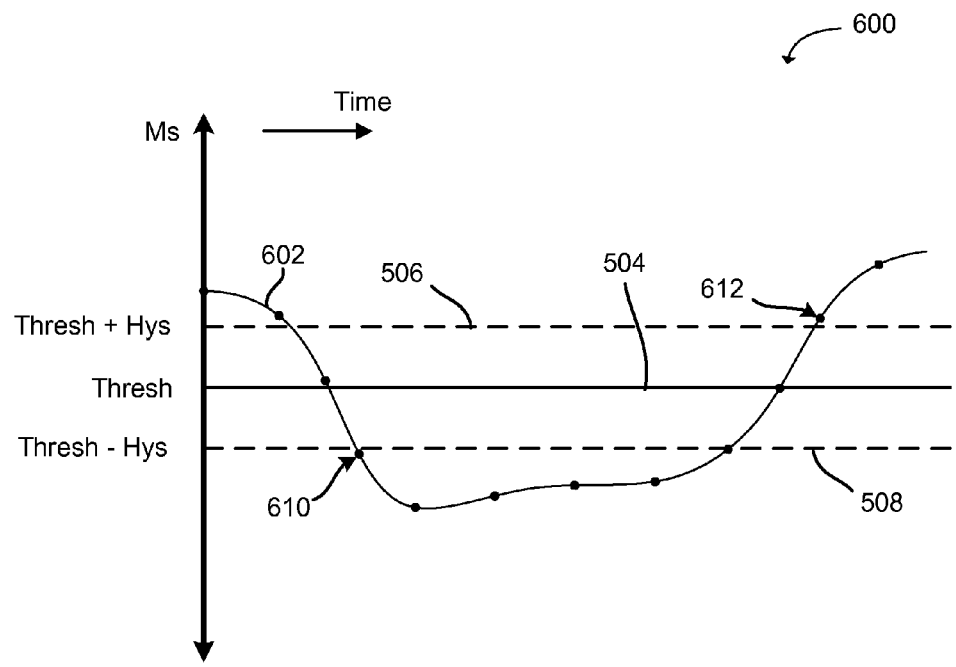
FIG. 6 is a graph illustrating a signal parameter falling below an absolute threshold consistent with embodiments disclosed herein.

FIG. 6 is a signal parameter graph 600 illustrating a signal parameter value Ms of a PD-RS over time as measured by the UE 102. The graph 600 includes a line 602 that illustrates a measured value for a signal parameter over time. The graph 600 also shows the absolute threshold value 504 as well as hysteresis values 506 and 508 of FIG. 5. Point 610 indicates when the UE 102 detects the occurrence of the entering condition and point 612 indicates where the UE 102 detects the occurrence of the leaving condition. In one embodiment, in response to detecting the entering condition the UE 102 may trigger a measurement report of a current value of the signal parameter to the eNB 104.

Figure 7:
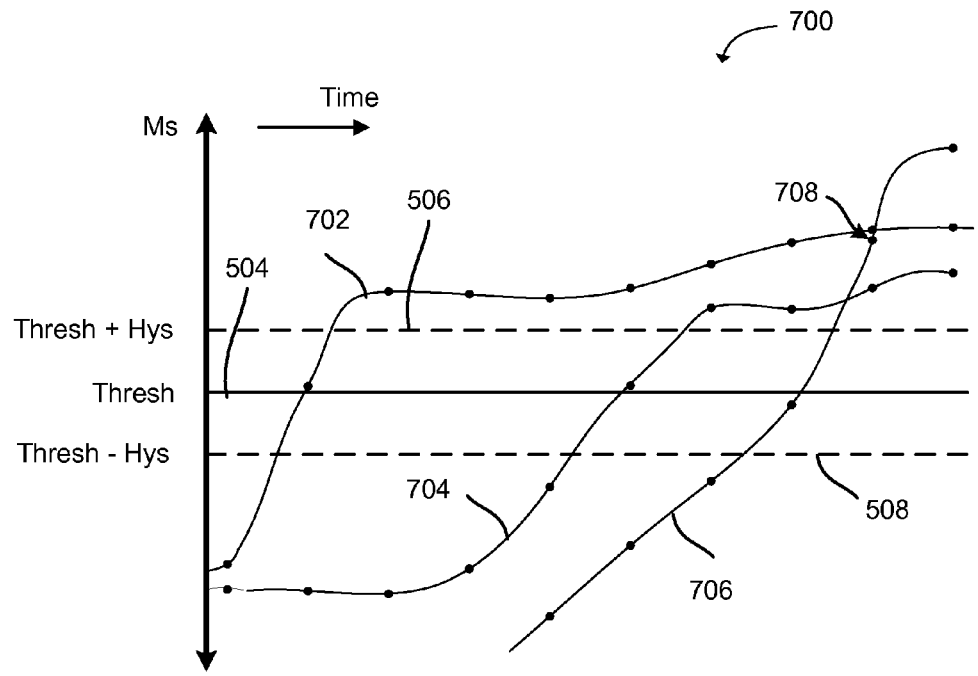
FIG. 7 is a graph illustrating signal parameters for multiple discovery signals exceeding an absolute threshold consistent with embodiments disclosed herein.

In one embodiment, the event definition defines occurrence of a signal parameter for a PD-RS and one or more additional PD-RSs exceeding an absolute threshold. For example, the event may define the occurrence of multiple PD-RSs exceeding an absolute threshold as defined by equations (1) and (2) above. Determining whether multiple UEs 102 have PD-RSs that exceed an absolute threshold may be useful in establishing a group D2D communication session. FIG. 7 illustrates an example of multiple signals 702, 704, and 706 exceeding the threshold based on equations (1) and (2) above. A UE 102 may detect occurrence of the signals 702, 704, and 706 all exceeding the threshold at point 708.

In one embodiment, an event definition defines an occurrence of a signal parameter for a PD-RS improving above a corresponding signal parameter for another PD-RS. For example, the event may define the occurrence of a first signal parameter improving above the second signal parameter. Determining comparative signal quality and/or proximity may be useful in determining which device can have the best connection with a given UE 102. The eNB 104 may be able to use this information to create a more efficient communication path between D2D-enabled UEs 102. The second signal parameter may correspond to a best PD-RS and/or a PD-RS of a device that is engaged in D2D communication with the UE 102. In one embodiment, an entering condition for improving above a corresponding signal parameter is determined based on equation (5) below and a leaving condition for falling below a corresponding signal parameter is determined based on equation (6) below.

$$Ms+Ocn-Hys>MRef+Ocb+Off \quad (5)$$

$$Ms+Ocn+Hys<MRef+Ocb+Off \quad (6)$$

MRef may correspond to a reference signal against which a PD-RS is being compared. For example, MRef may be the PD-RS for a device engaged in D2D communication with the UE 102, the best or strongest PD-RS in terms of signal quality detected by the UE 102. In one embodiment, which PD-RS to use as MRef may be configured by the eNB 104 and/or may correspond to an item in a PD-RS list with a lowest index. Ocn is the PD-RS specific offset for the measured value Ms. Ocb is the PD-RS specific offset for the reference signal MRef. For example, Ocn and Ocb may be the transmission offset provided as part of radio resource configuration information by the eNB 104 during configuration of the UE 102. Ocn and Ocb may be omitted, or may be zero, if all PD-RS are transmitted with the same power. Off may be an offset parameter (similar to Hys of equations 1-4). According to one embodiment, a measurement report is triggered in response to the entering condition. In one embodiment, the UE 102 may also determine whether the PD-RS corresponds to a device with which the UE 102 is in D2D communication before sending the measurement report.

Figure 8:
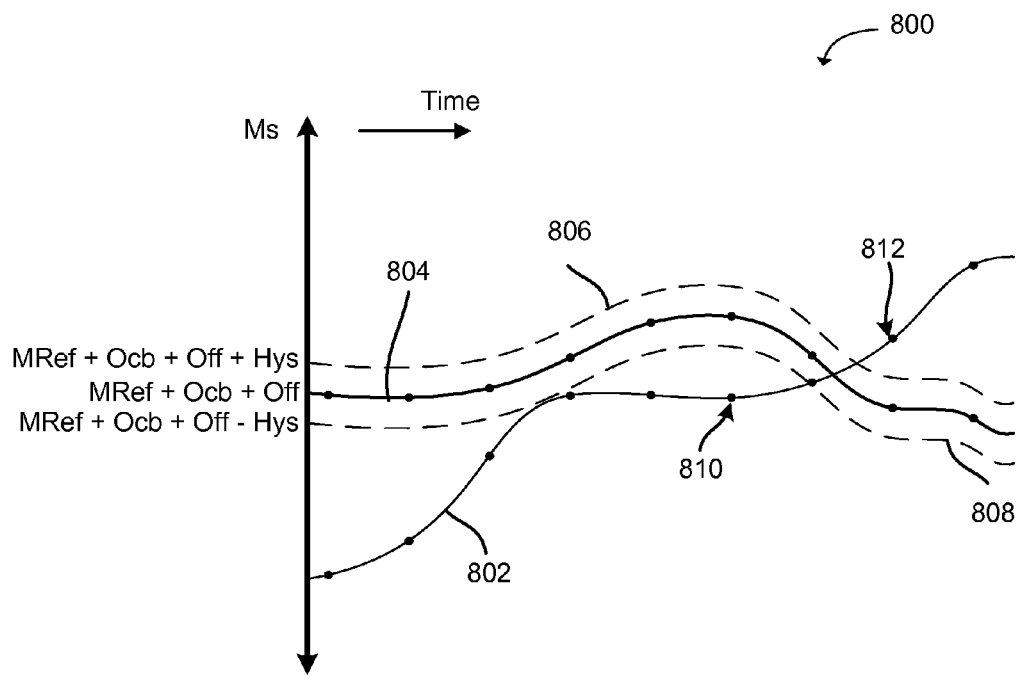
FIG. 8 is a graph illustrating a signal parameter improving above a corresponding signal parameter for a reference signal consistent with embodiments disclosed herein.

FIG. 8 is a signal parameter graph 800 illustrating a signal parameter value Ms plus a transmission offset Ocn (Ms+Ocn) of a PD-RS over time as measured by the UE 102. The graph 800 includes a line 802 that illustrates a measured value for the signal parameter plus the transmission offset (Ms+Ocn) over time. The graph 800 also shows the reference threshold value 804 (MRef+Ocb+Off) as well as offset values 806 (MRef+Ocb+Off+Hys) and 808 (MRef+Ocb+Off−Hys). Point 812 indicates when the UE 102 detects the occurrence of the entering condition and point 810 indicates where the UE 102 detects the occurrence of the leaving condition. In one embodiment, in response to detecting the entering condition the UE 102 may trigger a measurement report of a current value of the signal parameter to the eNB 104. As illustrated in FIG. 8, Mref+Ocb+Off may vary with time because it is based on a reference PD-RS (MRef).

In periodic reporting a UE 102 may report measurement results of any measured PD-RS every reporting interval. A reporting interval for proximity discovery signal can be configured by the eNB 104 or predefined in the specification. For proximity discovery purposes only, the UE 102 may not need to measure PD-RS periodically and measurement and/or reports may only be provided when requested by the eNB 104. A reporting amount value (e.g., reportAmount) can be provided by the eNB 104 to configure the UE 102 to send either a single measurement report (e.g., reportAmount=1) or multiple reports (e.g., reportAmount is greater than one, or even unlimited). In one embodiment, if a UE 102 is configured to send only one report, it may be desirable to give enough time for the UE 102 to detect other UEs 102 in proximity. Therefore, the monitoring time may be defined before the UE 102 sends a first measurement report and/or if at least a minimum number (e.g., N) of PD-RSs are available in the UE, where the minimum number is either predefined (e.g., N=1) or configured by the eNB 104 through RRC signaling.

In periodic reporting after event triggering, the UE 102 can send periodic reporting in response to a measurement meeting one of the above event triggered conditions.

The following is the example of ASN.1 coding for measurement reporting:

```
ReportConfigPD-RS ::=          SEQUENCE {
    triggerType    CHOICE {
        event          SEQUENCE {
            eventId                CHOICE {
                eventD1                SEQUENCE {
                    d1-Threshold           ThresholdEUTRA
                },
                eventD2                SEQUENCE {
                    d2-Threshold           ThresholdEUTRA
                },
                eventD3                SEQUENCE {
                    d3-OffsetRef           INTEGER (-30..30),
                    d3-OffbestBest         INTEGER (-30..30),
                    d3-Offset              INTEGER (-30..30)
                },
                eventD4                SEQUENCE {
                    d4-numberPD-RS         INTEGER (1..maxPD-RS),
                    d4-Threshold           ThresholdEUTRA
                },
```

```
                ...
            }
        },
        hysteresis              Hysteresis,
        timeToTrigger           TimeToTrigger
    },
    Periodical    SEQUENCE {
        purpose       ENUMERATED {
                                reportStrongestPD-RS, ...}
        }
    },
    triggerQuantity             ENUMERATED {rsrp, rsrq},
    reportQuantity              ENUMERATED {sameAsTriggerQuantity, both},
    reportInterval              ReportInterval,
    reportAmount                ENUMERATED {r1 , r2, r4, r8, r16, r32, r64, infinity},
    ...
}
ThresholdEUTRA ::=              CHOICE{
    threshold-RSRP                      RSRP-Range,
    threshold-RSRQ                      RSRQ-Range
}
Hysteresis ::=                  INTEGER (0..30)
ReportInterval ::=              ENUMERATED {ms120, ms240, ms480, ms640, ms1024,
                                ms2048, ms5120, ms10240,min1, min6, min12, min30,
                                min60, spare3, spare2, spare1}
RSRP-Range ::=                  INTEGER(0..97)
RSRQ-Range ::=                  INTEGER(0..34)
TimeToTrigger ::=               ENUMERATED {
                                    ms0, ms40, ms64, ms80, ms100, ms128, ms160,
                                    ms256, ms320, ms480, ms512, ms640, ms1024,
                                    ms1280, ms2560, ms5120}
maxPD-RS INTEGER ::=            128          -- Maximum number of PD-RS
```

The field eventID indicates a choice of PD-RS event triggered reporting criteria. The field Hysteresis is a parameter used within the entry and leave condition of an event-triggered reporting condition, such as the Hys variable included in equations (1) through (4). The actual value of Hysteresis in one embodiment is (Information Element (IE) value)*0.5 dB, where the IE value refers to a value fo Hysteresis as signaled as part of the measurement reporting configuration via ReportConfigPD-RS. The field reportAmount indicates a number of measurement reports applicable for the triggerType event as well as for the triggerType periodical. The field ReportInterval indicates a time interval between periodical reports.

The ReportInterval is applicable if the UE 102 performs periodical reporting (i.e., when reportAmount exceeds 1). The value ms120 corresponds with 120 ms, ms240 corresponds with 240 ms and so on, while value mini corresponds with 1 minute, min6 corresponds with 6 minutes and so on. The field reportQuantity indicates quantities to be included in a measurement report. The value both means that both the reference signal received power (RSRP) and the reference signal receive quality (RSRQ) quantities are to be included in the measurement report. The field ThresholdEUTRA indicates a threshold for event evaluation. For RSRP the actual threshold value is (IE value—140) dBm. For RSRQ the actual threshold value is (IE value—40)/2 dB. The field timeToTrigger indicates the time in ms during which specific criteria for the event needs to be met in order to trigger a measurement report. The field triggerQuantity indicates the quantities used to evaluate the triggering condition for the event. The values RSRP and RSRQ correspond to proximity discovery reference signal received power (PD-RSRP) and reference signal received quality (PD-RSRQ).

Figure 9:
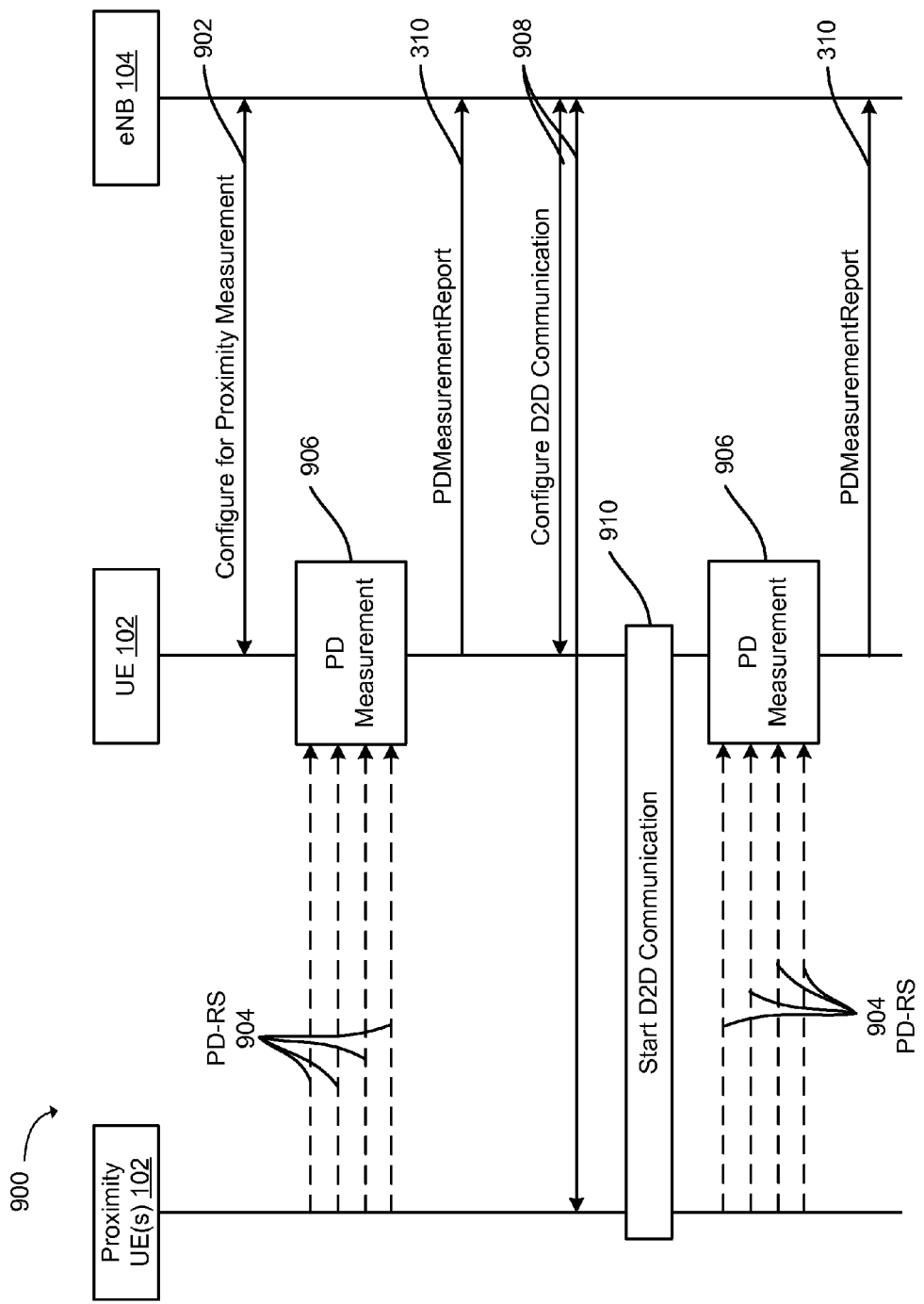
FIG. 9 is a diagram of a communication message flow illustrating communication between a UE, an eNB, and proximity UEs to configure, measure, and report proximity detection measurements consistent with embodiments disclosed herein.

FIG. 9 is a diagram of a communication message flow illustrating a communication procedure 900 between a UE 102 and an eNB 104 to configure, measure, and report proximity detection measurements, according to one embodiment.

The UE 102 and eNB 104 configure 902 proximity measurement. In one embodiment, the proximity measurement may be configured 902 in a manner similar to that discussed in relation to FIG. 3. For example, configuring 902 proximity measurement may include the eNB 104 enquiring 302 as to the capabilities of the UE 102, the UE 102 providing 304 capability information, and the eNB 104 providing 306 measurement configuration information to the UE 102, with any of the variation as discussed herein.

The proximity UEs 102 may transmit PD-RS 904 which are then measured 906 by the UE 102. The UE 102 then provides 310 measurement reports to the eNB 104. The measurement reports may be provided 310 based on event triggered reporting, periodic reporting, and periodic reporting after event triggering as discussed above.

Based on the received measurement reports, the eNB 104 configures 908 the UE 102 and any proximity UEs 102 for D2D communication. For example, the eNB 104 may configure 908 D2D communication when the measurement reports provided 310 by the UE 102 indicate that the proximity UEs 102 are close enough to establish D2D communication. Based on the configuration 908 from the eNB 104, the UE 102 and any proximity UEs 102 start 910 D2D communication.

The UE 102 continues to measure PD-RSs 906 from the proximity UEs 102 to monitor D2D communication and/or to detect additional UEs 102 that come within proximity. The UE 102 also continues to provide 310 measurement reports as configured 902 by the eNB 104. According to one embodiment, the eNB 104 may modify the D2D communication and/or end D2D communication based on the measurement reports provided 310 by the UE 102.

Figure 10:
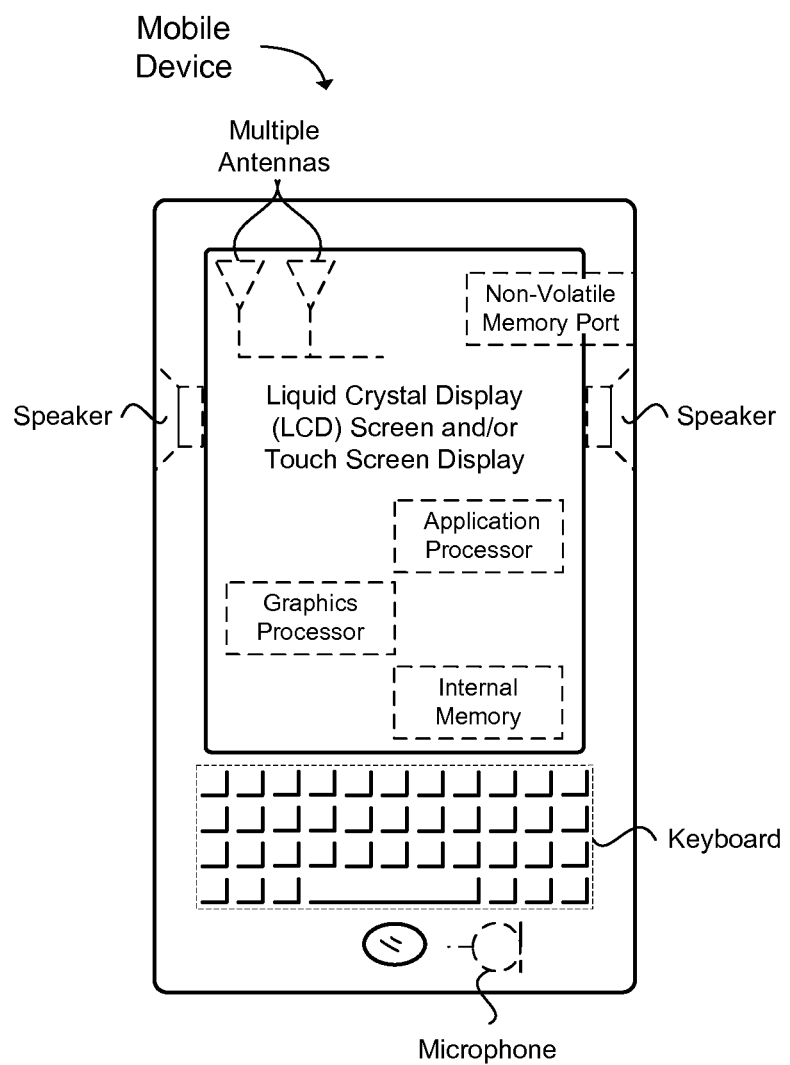
FIG. 10 is a schematic diagram of a mobile device consistent with embodiments disclosed herein.

FIG. 10 provides an example illustration of a mobile device, such as a user equipment (UE), a mobile station (MS), a mobile wireless device, a mobile communication device, a tablet, a handset, or another type of mobile wireless device. The mobile device can include one or more antennas configured to communicate with a transmission station, such as a base station (BS), an evolved Node B (eNB), a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, High Speed Packet Access (HSPA), Bluetooth, and/or WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 10 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

EXAMPLES

The following examples pertain to further embodiments.

Example 1 is a UE that includes processing circuitry. The processing circuitry is configured to receive and store a PD-RS list from an eNB. The PD-RS list includes a radio resource configuration for at least a first PD-RS. The processing circuitry measures at least the first PD-RS to determine a signal parameter for the first PD-RS and reports the signal parameter for the first PD-RS to the eNB.

In Example 2, the radio resource configuration for the first PD-RS of Example 1 can optionally include a transmission offset. The transmission offset indicates a transmission power of the first PD-RS.

In Example 3, the radio resource configuration for the first PD-RS of Examples 1-2 can optionally include an identifier for the first PD-RS.

In Example 4, the processing circuitry of Examples 1-3 can optionally be further configured to receive an open discovery mode configuration. The open discovery mode configuration configures the UE to measure any PD-RS in addition to the PD-RSs listed in the PD-RS list.

In Example 5, wherein the processing circuitry of Examples 1-4 can optionally be further configured to receive a restricted discovery mode configuration. The restricted discovery mode configuration configures the UE to only measure PD-RSs listed in the PD-RS list.

In Example 6, the receiving and storing the PD-RS list of Examples 1-5 can optionally include receiving a PD-RS addition message comprising the radio resource configuration for the first PD-RS and storing the radio resource configuration in the PD-RS list.

In Example 7, the receiving and storing the PD-RS list of Examples 1-6 can optionally include receiving a PD-RS replacement message comprising the radio resource configuration for the first PD-RS and storing the radio resource configuration in the PD-RS list to replace previous radio resource configuration information.

In Example 8, the processing circuitry of Examples 1-7 can optionally be further configured to receive a PD-RS removal message indicating removal of an entry for a second PD-RS and remove the entry for the second PD-RS from the PD-RS list in response to receiving the PD-RS removal message.

In Example 9, a PD-RS removal message of Examples 1-8 can optionally include an index for the entry for the second PD-RS.

Example 10 is a UE including a receiver, a processor, and a transmission component. The receiver component is configured to receive, from an eNB, measurement report configuration data comprising an event definition. The receiver component is configured to measure a reference signal to determine a signal parameter for the reference signal. The signal parameter for the reference signal includes a signal strength of the reference signal. The processor is configured to detect an event based on the signal parameter for the reference signal and the event definition. The event indicates a change in the signal parameter for the reference signal. The transmission component is configured to report, in response to detecting the event, the signal parameter for the reference signal to the eNB.

In Example 11, the event definition of Example 10 defines occurrence of the signal parameter for the reference signal exceeding an absolute threshold.

In Example 12, the event definition of Example 10-11 can optionally define occurrence of the signal parameter for the reference signal falling below an absolute threshold when a device corresponding to the reference signal is in D2D communication with the UE.

In Example 13, the event definition of Examples 10-12 can optionally define occurrence of a first signal parameter for the reference signal improving above a second signal parameter for a reference signal of a device that is a member of a D2D group comprising the UE.

In Example 14, the event definition of Examples 10-13 can optionally define occurrence of the signal parameter for the reference signal and one or more additional reference signal exceeding an absolute threshold.

In Example 15, the processor of Examples 10-14 can optionally be configured to determine that the reference signal corresponds to a device that is engaged in D2D communication with the UE.

In Example 16, the measurement report configuration data received by the receiver component of Examples 10-15 can optionally further include a reporting interval. The measurement report configuration data configures the transmission component to provide a measurement report to the eNB one or more of: periodically on the reporting interval regardless of whether the event is detected; and periodically on the reporting interval in response to detecting the event.

Example 17 is a UE that includes a transmission component, a receiver component, and a processor. The transmission component is configured to provide capability information to an eNB indicating that the UE is not capable of simultaneous transmission or reception of additional signals while receiving reference signals. The receiver component is configured to receive a measurement gap pattern from the eNB. The measurement gap pattern includes a measurement gap. The processor configures, based on the measurement gap pattern, the UE to perform proximity detection measurement on one or more reference signals during the measurement gap. The processor configures the UE to prohibit transmission or reception of additional signals during the measurement gap.

In Example 18, the measurement gap of the measurement gap pattern of Example 17 can optionally occur on a period greater than a cell reference signal.

In Example 19, the measurement gap of Examples 17-18 can optionally be shared with one or more of inter-frequency measurement and inter-RAT measurement.

In Example 20, the receiver component of Examples 17-19 can optionally further receive prioritization information to prioritize one or more of the proximity detection measurement, the inter-frequency measurement, and the inter-RAT measurement to be performed first by the UE.

Example 21 is a method for proximity detection. The method includes providing a measurement capability enquiry to a UE. The method includes receiving measurement capability information from the UE. The measurement capability information indicates whether the UE is capable of simultaneous transmission and reception of UL signals. The method includes providing proximity detection measurement configuration information for configuring proximity detection and reporting at the UE based on the proximity detection measurement configuration information. The measurement configuration information includes one or more of a measurement gap pattern, radio resource configuration information for a reference signal, an event definition, and a reporting interval. The method includes receiving measurement reports from the UE regarding one or more reference signals measured by the UE.

In Example 22, the method of Example 21 can optionally further include configuring D2D communication between the UE and one or more devices corresponding to the one or more PD-RSs based on the received measurement reports.

In Example 23, configuring D2D communication of Examples 21-22 can optionally include one or more of establishing D2D communication, modifying D2D communication, and ending D2D communication between the UE and the one or more devices.

Example 24, is an eNB that includes processing circuitry. The processing circuitry maintains a reference signal list on a mobile station. The reference signal list includes radio resource configurations for one or more reference signals.

The processing circuitry receives measurement reports from the mobile station regarding at least one reference signal of the one or more reference signals on the reference signal list measured by the mobile station. The processing circuitry configures D2D communication between the mobile station and one or more devices corresponding to the one or more reference signals based on the received measurement reports.

In Example 25, configuring D2D communication in Example 24 optionally includes one or more of establishing D2D communication, modifying D2D communication, and ending D2D communication between the mobile station and the one or more devices.

Example 26 is a method for proximity detection. The method includes receiving and storing a PD-RS list from an eNB, the PD-RS list comprising a radio resource configuration for at least a first (PD-RS). The method includes measuring at least the first PD-RS to determine a signal parameter for the first PD-RS. The method includes reporting the signal parameter for the first PD-RS to the eNB.

In Example 27, the radio resource configuration for the first PD-RS of Example 26 can optionally include a transmission offset. The transmission offset indicates a transmission power of the first PD-RS.

In Example 28, the radio resource configuration for the first PD-RS of Examples 26-27 can optionally include an identifier for the first PD-RS.

In Example 29, the method of Examples 26-28 can optionally include receiving an open discovery mode configuration. The open discovery mode configuration configures the UE to measure any PD-RS in addition to the PD-RSs listed in the PD-RS list.

In Example 30, the method of Examples 26-29 can optionally include receiving a restricted discovery mode configuration. The restricted discovery mode configuration configures the UE to only measure PD-RSs listed in the PD-RS list.

In Example 31, the receiving and storing the PD-RS list of Examples 26-30 can optionally include receiving a PD-RS addition message including the radio resource configuration for the first PD-RS and storing the radio resource configuration in the PD-RS list.

In Example 32, the receiving and storing the PD-RS list of Examples 26-31 can optionally include receiving a PD-RS replacement message including the radio resource configuration for the first PD-RS and storing the radio resource configuration in the PD-RS list to replace previous radio resource configuration information.

In Example 33, the method of Examples 26-32 can optionally include receiving a PD-RS removal message indicating removal of an entry for a second PD-RS and removing the entry for the second PD-RS from the PD-RS list in response to receiving the PD-RS removal message.

In Example 34, a PD-RS removal message of Example 33 optionally includes an index for the entry for the second PD-RS.

In Example 35, the methods of Examples 26-34 can optionally include receiving at least one of a measurement gap pattern, an event definition, and/or a reporting interval.

In Example 36, an apparatus optionally includes means to perform an of the methods of Examples 26-35.

Example 37 is a UE that includes a receiver component, a processor, and a transmission component. The receiver component is configured to receive, from an eNB, measurement report configuration data comprising an event definition. The receiver component is configured to measure a reference signal to determine a signal parameter for the reference signal. The signal parameter for the reference signal includes a signal strength of the reference signal. The processor is configured to detect an event based on the signal parameter for the reference signal and the event definition. The event indicates a change in the signal parameter for the reference signal. The transmission component is configured to report, in response to detecting the event, the signal parameter for the reference signal to the eNB.

In Example 38, the event definition of Example 38 can optionally define occurrence the signal parameter for the reference signal exceeding an absolute threshold.

In Example 39, the event definition of Examples 37-38 can optionally define occurrence of the signal parameter for the reference signal falling below an absolute threshold when a device corresponding to the reference signal is in D2D communication with the UE.

In Example 40, the event definition of Examples 37-39 can optionally define occurrence of a first signal parameter for the reference signal improving above a second signal parameter for a reference signal of a device that is a member of a D2D group comprising the UE.

In Example 41, the event definition of Examples 37-40 can optionally define occurrence of the signal parameter for the reference signal and one or more additional reference signal exceeding an absolute threshold.

In Example 42, the processor of Examples 37-41 can optionally be configured to determine that the reference signal corresponds to a device that is engaged in D2D communication with the UE.

In Example 43, the measurement report configuration data received by the receiver component of Examples 37-42 optionally includes a reporting interval.

In Example 44, the measurement report configuration data of Examples 37-43 optionally configures the transmission component to provide a measurement report to the eNB periodically on the reporting interval regardless of whether the event is detected.

In Example 44, the measurement report configuration data of Examples 37-43 optionally configures the transmission component to provide a measurement report to the eNB periodically on the reporting interval in response to detecting the event.

Example 45 is machine readable storage including machine-readable instructions, when executed, to implement a method or realize an apparatus of any of Examples 1-44.

Those having skill in the art will appreciate that many changes may be made to the details of the above-described embodiments without departing from the underlying principles of the disclosure. The scope of the present disclosure should, therefore, be determined only by the following claims.

The invention claimed is:

1. User equipment (UE) comprising processing circuitry configured to:
   receive and store a proximity discovery reference signal (PD-RS) list from an evolved universal terrestrial radio access network (E-UTRAN) node B (eNB), the PD-RS list comprising a radio resource configuration for at least a first PD-RS;
   receive a restricted discovery mode configuration, wherein the restricted discovery mode configuration configures the UE to only measure PD-RSs listed in the PD-RS list;
   measure at least the first PD-RS to determine a signal parameter for the first PD-RS; and
   report the signal parameter for the first PD-RS to the eNB.

2. The UE of claim 1, wherein the radio resource configuration for the first PD-RS comprises a transmission offset, the transmission offset indicating a transmission power of the first PD-RS.

3. The UE of claim 1, wherein the radio resource configuration for the first PD-RS comprises an identifier for the first PD-RS.

4. The UE of claim 1, wherein receiving and storing the PD-RS list comprises receiving a PD-RS addition message comprising the radio resource configuration for the first PD-RS and storing the radio resource configuration in the PD-RS list.

5. The UE of claim 1, wherein receiving and storing the PD-RS list comprises receiving a PD-RS replacement message comprising the radio resource configuration for the first PD-RS and storing the radio resource configuration in the PD-RS list to replace previous radio resource configuration information.

6. The UE of claim 1, wherein the processing circuitry is further configured to receive a PD-RS removal message indicating removal of an entry for a second PD-RS and remove the entry for the second PD-RS from the PD-RS list in response to receiving the PD-RS removal message.

7. The UE of claim 5, wherein the PD-RS removal message comprises an index for the entry for the second PD-RS.

8. User equipment (UE) comprising processing circuitry configured to:
receive and store a proximity discovery reference signal (PD-RS) list from an evolved universal terrestrial radio access network (E-UTRAN) node B (eNB), the PD-RS list comprising a radio resource configuration for at least a first PD-RS;
receive a PD-RS removal message indicating removal of an entry for a second PD-RS and remove the entry for the second PD-RS from the PD-RS list in response to receiving the PD-RS removal message;
measure at least the first PD-RS to determine a signal parameter for the first PD-RS; and
report the signal parameter for the first PD-RS to the eNB.

9. The UE of claim 8, wherein the radio resource configuration for the first PD-RS comprises a transmission offset, the transmission offset indicating a transmission power of the first PD-RS.

10. The UE of claim 8, wherein the radio resource configuration for the first PD-RS comprises an identifier for the first PD-RS.

11. The UE of claim 8, wherein the processing circuitry is further configured to receive an open discovery mode configuration, wherein the open discovery mode configuration configures the UE to measure any PD-RS in addition to the PD-RSs listed in the PD-RS list.

12. The UE of claim 8, wherein receiving and storing the PD-RS list comprises receiving a PD-RS addition message comprising the radio resource configuration for the first PD-RS and storing the radio resource configuration in the PD-RS list.

13. The UE of claim 8, wherein receiving and storing the PD-RS list comprises receiving a PD-RS replacement message comprising the radio resource configuration for the first PD-RS and storing the radio resource configuration in the PD-RS list to replace previous radio resource configuration information.

14. The UE of claim 8, wherein the PD-RS removal message comprises an index for the entry for the second PD-RS.

15. User equipment (UE) comprising:
a transceiver configured to transmit and receive signals; and
a processing unit configured to cause the UE to:
receive and store a proximity discovery reference signal (PD-RS) list from an evolved universal terrestrial radio access network (E-UTRAN) node B (eNB), the PD-RS list comprising a radio resource configuration for at least a first PD-RS;
receive a restricted discovery mode configuration, wherein the restricted discovery mode configuration configures the UE to only measure PD-RSs listed in the PD-RS list;
measure at least the first PD-RS to determine a signal parameter for the first PD-RS; and
report the signal parameter for the first PD-RS to the eNB.

16. The UE of claim 15, wherein the radio resource configuration for the first PD-RS comprises a transmission offset, the transmission offset indicating a transmission power of the first PD-RS.

17. The UE of claim 15, wherein the radio resource configuration for the first PD-RS comprises an identifier for the first PD-RS.

18. The UE of claim 15, wherein receiving and storing the PD-RS list comprises receiving a PD-RS addition message comprising the radio resource configuration for the first PD-RS and storing the radio resource configuration in the PD-RS list.

19. The UE of claim 15, wherein receiving and storing the PD-RS list comprises receiving a PD-RS replacement message comprising the radio resource configuration for the first PD-RS and storing the radio resource configuration in the PD-RS list to replace previous radio resource configuration information.

20. The UE of claim 15, wherein the processing unit is further configured to receive a PD-RS removal message indicating removal of an entry for a second PD-RS and remove the entry for the second PD-RS from the PD-RS list in response to receiving the PD-RS removal message.

21. The UE of claim 20, wherein the PD-RS removal message comprises an index for the entry for the second PD-RS.

22. The UE of claim 15, wherein the processing unit is further configured to receive instruction from the eNB to establish or release D2D communication with a UE corresponding to the first PD-RS.

* * * * *